July 15, 1969 M. C. RENNER 3,456,190
DETECTOR CIRCUIT EMPLOYING SIGNAL DIVISION MEANS
Filed May 23, 1966 3 Sheets-Sheet 3
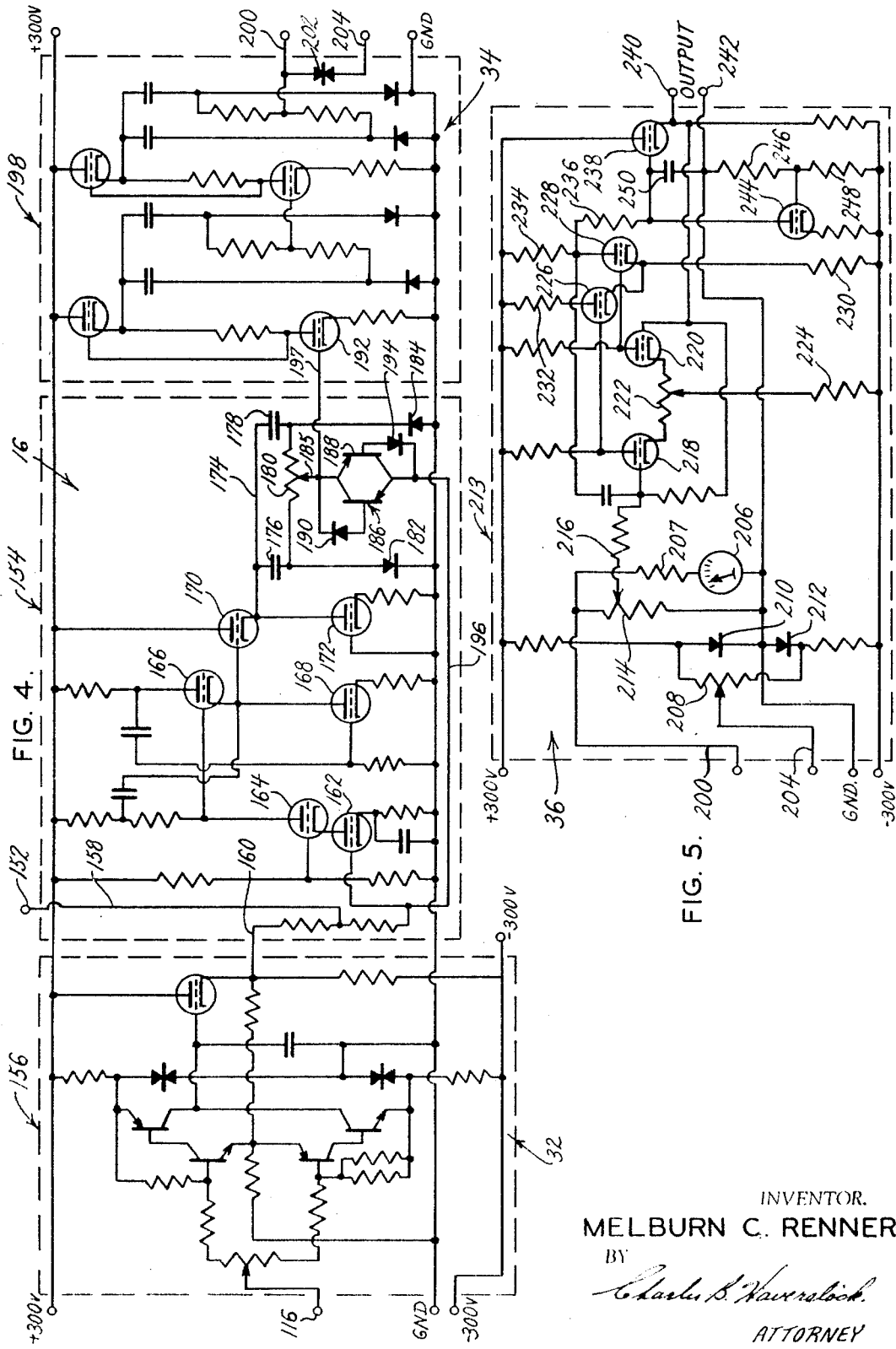
INVENTOR.
MELBURN C. RENNER
BY
Charles B. Haverstock
ATTORNEY United States Patent Office 3,456,190
Patented July 15, 1969

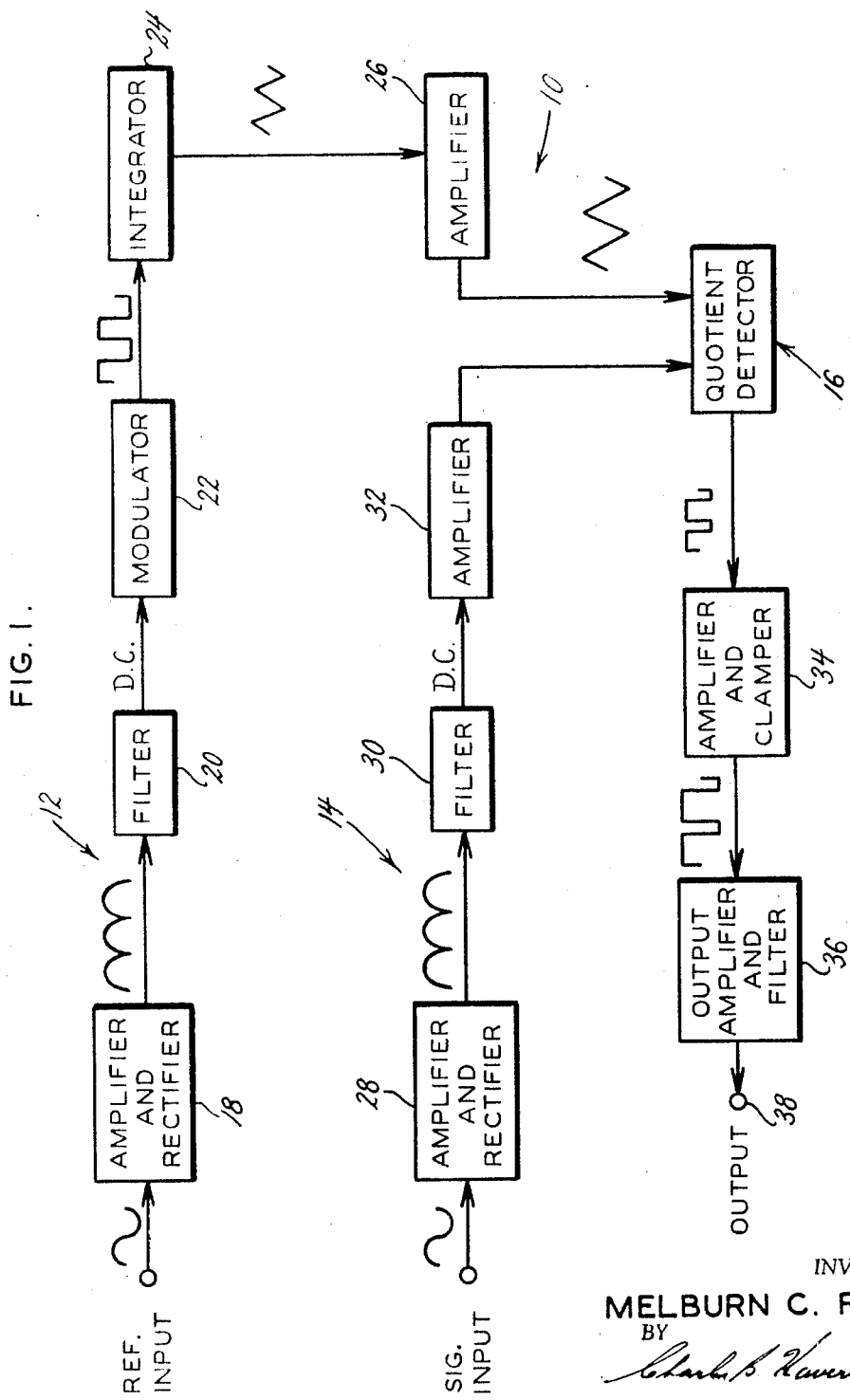

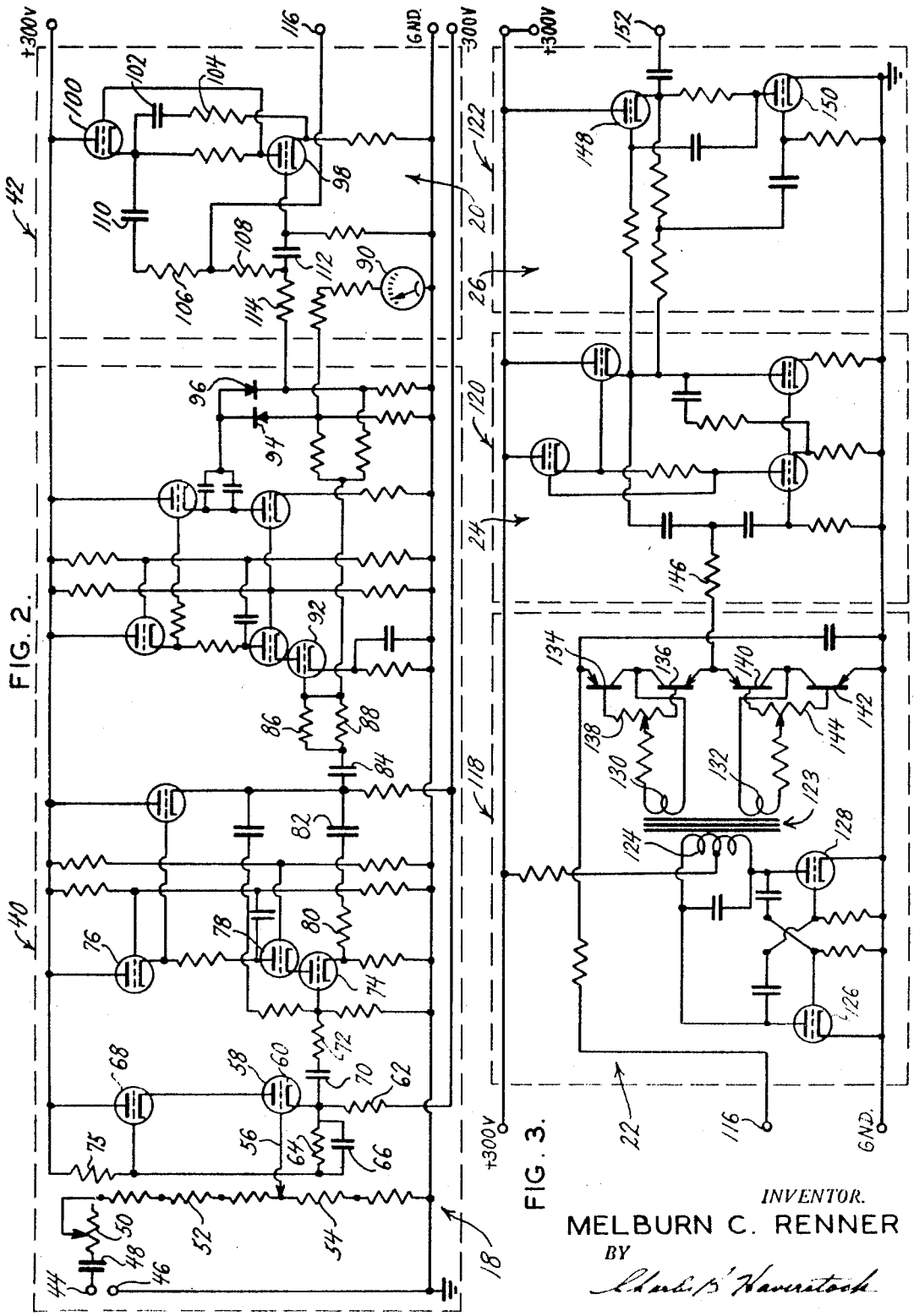

1

3,456,190
DETECTOR CIRCUIT EMPLOYING SIGNAL
DIVISION MEANS
Melburn C. Renner, Montgomery City, Mo., assignor to
McDonnell Aircraft Corporation, St. Louis, Mo., a
corporation of Maryland
Filed May 23, 1966, Ser. No. 552,099
Int. Cl. G06g 7/16; G01r 7/04
U.S. Cl. 324—140                10 Claims

ABSTRACT OF THE DISCLOSURE

An electronic circuit for generating an output signal porportional to the ratio between two input signals.

---

The present invention relates generally to electronic circuits and the like and more particularly to an electronic detector circuit including signal division means.

Many electronic detector circuits are in existence and used in a great variety of ways and for many purposes. There are also many known devices and circuits capable of dividing two quantities or signals in order to produce an output representing the quotient of the division operation. the known devices and circuits for the most part, however, are relatively expensive and complicated and are not accurate, sensitive, and stable enough to be relied on for many applications. The known devices are also relatively limited in operating range and therefore unsuitable for many purposes. Furthermore, most of the available devices employ movable parts such as servos and the like which are relatively slow acting and the performance of most known devices depends in large measure on characteristics of elements employed such as the characteristics of devices such as vacuum tubes and semi-conductors which may differ from element to element thereby making the known devices relatively unreliable. These and other disadvantages and shortcomings of known and available detector means are overcome by the present invention which teaches the construction and operation of a detector circuit including electronic signal division means, which circuit employs no moving parts, is relatively independent of the characteristics of the elements employed, is extremely fast acting, is accurate and reliable, and remains stable over long periods of time and under varying conditions.

It is therefore a principal object of the present invention to provide relatively simple and inexpensive detector means including division means which are acurate, stable, and have a wide operating range.

Another object is to provide a detector circuit with division capability which is relatively independent of the characteristics of the circuit elements employed.

Another object is to provide electronic means for dividing signals.

Another object is to increase the speed and response characteristics of detector circuits and the like.

Another object is to provide improved means for electronically dividing two signals by each other and producing a continuous quotient output signal representing the continuous division operation.

Another object is to provide relatively drift free detector means.

Another object is to provide improved quotient detector means for use in conjunction with plotting devices, material and component testing devices, computers and like devices.

These and other objects and advantages of the present invention will become apparent after considering the following detailed specification which covers a particular

2 embodiment thereof in conjunction with the accompanying drawings wherein:

FIG. 1 is a block diagram of a circuit constructed according to the present invention; and, FIGS. 2-5 are schematic wiring diagrams showing in detail actual circuits corresponding to the various blocks included in the diagram of FIG. 1.

Referring to the drawings more particularly by reference numbers, number 10 in FIG. 1 refers to a detector circuit constructed according to the present invention. The circuit 10 has two input signal channels including a reference input channel 12 which receives reference input signals from a first signal source, and a signal input channel 14 which receives signal inputs from another signal source. The outputs from the channels 12 and 14 are fed as inputs to an electronic quotient detector circuit 16 which performs a continuous division operation on the two inputs and produces a quotient output signal representing the quotient of the division operation as will be shown.

The reference input channel 12 includes an amplifier-rectifier circuit 18 which receives and amplifies the reference input signals it receives and produces a rectified output similar in shape to the signal illustrated by the sketch adjacent to the output side of block 18. A half wave rectifier could also be used instead of a full wave rectifier. This amplified and rectified signal is fed to filter circuit 20 which converts it to a D.C. signal, the magnitude of which varies with the magnitude of the reference input. The D.C. output of the filter circuit 20 is fed to modulator circuit 22 which includes means to modulate the D.C. by producing a constant frequency square wave whose amplitude is proportional to the level of the reference input. The modulated output of the circuit 22 is then fed to an integrator circuit 24 which converts the square wave signal into a triangular shaped signal as shown or if preferred into a saw tooth signal whose amplitude is proportional to the reference input. Thereafter the triangular or saw tooth signal is amplified by amplifier circuit 26 and fed as one input to the quotient detector 16. The square wave output of the modulator circuit 22 and the triangfular shaped output of the integrator circuit 24 are therefore both proportional to the magnitude of the D.C. analog voltage at the output of the filter circuit 20 and hence also proportional to the reference input signal.

The signal input channel 14 is similar in some respects to the reference signal input channel 12. For example, the channel 14 includes an input amplifier-rectifier circuit 28 which receives the signal inputs, amplifies them and rectifies them in a manner similar to the circuit 18. The amplified and rectified signals are also fed to filter circuit 30 which converts the signal inputs to a D.C. signal proportional thereto. This D.C. signal is then fed to amplifier circuit 32 where it is amplified and fed as a second input to the quotient detector circuit 16. The inputs to the detector circuit 16 therefore include a triangular or saw tooth signal proportional to the reference input signal, and a D.C. signal proportional to the signal input. These signals are divided by means included in the detector circuit 16 as will be shown and produce a detector output in the form of a square wave proportional to the quotient of the division operation. The square wave output of the quotient detector 16 is then fed to an amplifier-clamper circuit 34 and finally to output amplifier-filter circuit 36. The output of the circuit 36 appearing on output terminal 38 is a signal that is proportional to the quotient obtained by dividing the reference input by a signal input. The division can also be performed by applying the signal input to channel 12 and the reference input to channel 14 without changing the nature of the invention.

Typical circuits included in the various blocks shown in FIG. 1 are illustrated in detail in FIGS. 2–5. For the most part the circuits are illustrated and described as tube circuits although it is anticipated that they can be transistorized in whole or in part without changing the nature of the invention.

The circuit outline identified by number 40 in FIG. 2 is an amplifier-rectifier circuit similar to the amplifier-rectifier circuits 18 and 28 of FIG. 1, and the circuit in outline 42 in FIG. 2 is a filter circuit similar to the circuits 20 and 30. The circuit 18 (or 28) has input connections 44 and 46 which are connected to a source of reference or signal inputs depending on which channel is considered. The input signals are fed through capacitor 48, a selected portion of potentiometer 50 and a selected portion of a voltage divider circuit which includes resistors 52 and 54 to the grid 56 of vacuum tube 58. The cathode 60 of the tube 58 is negatively biased by a connection through resistor 62 to a negative supply voltage, and the cathode 60 is also connected through a circuit which includes parallel connected resistor 64 and capacitor 66 to a control grid of another vacuum tube 68 which is in series with tube 58. The cathode 60 of tube 58 is also connected through capacitor 70 and resistor 72 to the grid of tube 74 in the succeeding amplifier stage. The plate of the tube 58 is connected to the cathode of the tube 68, and the plate of tube 68 is connected to the positive supply voltage. A resistor 75 is also connected between the plate and grid electrodes of the tube 68 as shown. When the input signal on the grid of the tube 58 increases, the potential on the cathode also increases because there is then less impedance between the cathode and the positive voltage supply. This condition is accentuated by the connection between the cathode 60 and the grid of tube 68.

The increase in potential on the cathode 60 produces a corresponding increase in potential on the grid of the tube 74 and hence also increases its cathode potential. Two vacuum tubes 76 and 78 are connected in series with the tube 74 across the positive and negative supply voltages, and these tubes have their grids connected to fixed control potentials determined by respective resistive voltage divider circuits. The output of the tube 74 is taken at its cathode electrode and is applied to a circuit which includes resistor 80, capacitors 82 and 84, and parallel resistors 86 and 88 connected as shown. The output side of the resistors 86 and 88 is connected to a circuit which includes a meter 90 that indicates the strength of the reference signal input. The output side of the resistors 86 and 88 is also connected to the grid of vacuum tube 92 which is part of another amplification stage similar to the stages already described. The output of this last amplification stage is fed as an input to a circuit which includes oppositely polarized diodes or rectifiers 94 and 96 which rectify the amplified reference signal before it goes to the filter circuit 20.

The rectified output is then fed to the filter circuit 20 shown within the outline 42 of FIG. 2. The circuit 20 includes two vacuum tubes 98 and 100 connected in a circuit between the positive supply voltage and ground. The input to the filter circuit is connected by suitable circuit means to be described to the grid of the tube 98, and the plate of the tube 98 is connected directly to the grid of the tube 100. The cathodes of the tubes 98 and 100 are connected through a circuit which includes series connected capacitor 102 and resistor 104, and the output of the filter circuit 20 is taken from between resistors 106 and 108 which are connected in series with capacitors 110 and 112 respectively between the cathode of the tube 100 and the grid of the tube 98. The capacitor 112 and resistor 114 are in the input circuit to the filter 20.

The filter output on terminal 116 is a D.C. voltage the magnitude of which varies with the magnitude and other characteristics of the reference or signal input depending on which channel is being considered. As already mentioned, the amplifier-rectifier circuits 18 and 28 and the filter circuits 20 and 30 may be similar in both channels.

FIG. 3 shows the details of the modulator circuit 22 (outline 118), the integrator circuit 24 (outline 120), and the amplifier circuit 26 (outline 122). The circuits 22 and 24 are included only in the channel 12, but both channels are shown provided with a second amplifier such as the circuts 26 and 32. The particular modulator circuit 22 includes both solid state and vacuum tube elements. The modulator circuit also includes a transformer 123 with a tapped primary winding 124 which together with tubes 126 and 128 and the associated circuit elements forms an oscillator circuit. The transformer 123 has two secondary windings 130 and 132 which are connected respectively to circuits which include two transistors each. The transformer secondary 130 is connected to a circuit which includes transistors 134 and 136 and potentiometer 138 connected as shown, and the transformer secondary 132 is connected to a similar circuit which includes transistors 140 and 142 and potentiometer 144. The bases of the transistors 134 and 136 are connected to opposite ends of the potentiometer 138, and the bases of the transistors 140 and 142 are connected to opposite ends of the potentiometer 144. In effect the two transistor pairs are connected between the D.C. input and ground and the output of the modulator circuit 22 is taken at the connection between the emitter electrodes of the transistors 136 and 140. The output of the modulator is a symmetrical square wave signal as shown and is produced by converting the sinusoidal output of the oscillator circuit to a square wave, the magnitude of which is modied by the biasing action of the D.C. input at terminal 116 applied across the circuit formed by the transistors 134, 136, 140 and 142. This square wave signal is fed through resistor 146 as the input to the integrator circuit 24 (outline 120 in FIG. 3). The integrator circuit 24 is an RC circuit which includes vacuum tubes and other elements connected as shown. The integrating circuit converts the square wave output of the modulator circuit 22 into a triangular shaped signal preferably having straight slopes as shown in FIG. 1. A saw tooth signal could also be used if desired..

The output triangular wave produced by the integrator circuit 24 is applied to the input of the amplifier circuit 26 (outline 122 in FIG. 3), which circuit includes series connected vacuum tubes 148 and 150 connected between the positive supply voltage and ground. The grids of the tubes 148 and 150 are both connected to the output of the integrator circuit 24 through circuits which include resistors and capacitors connected as shown. The output of the amplifier circuit 26 is taken on lead 152, and is fed as one of two input signals to the quotient detector circuit 16 (outline 154 in FIG. 4). The other detector input is the D.C. output of channel 14. Inasmuch as the form of the outputs of channels 12 and 14 are different, the amplifier circuits 26 and 32 are also different. For example, the amplifier 26 amplifies the triangular shaped output of the circuit 24 while the amplifier circuit 32 (outline 156 in FIG. 4) amplifies the D.C. ouput of the filter circuit 30.

The construction and operation of the quotient detector circuit 16 is of particular importance to the present invention and includes electronic means for dividing one of the input signals by the other to produce an output representing the ratio or quotient thereof. The output of the detector circuit is a constant frequency, pulse width modulated signal obtained by combining the D.C. output signal from the one channel with the triangular shape signal output of the other channel. The combination signal is applied to the detector circuit which includes a pair of oppositely polarized transistors (or diodes) which are so connected that one of them will conducit when the combined signal voltage reaches or exceeds a predetermined voltage and the other will conduct in the opposite direction when the combined voltage is less than the predetermined value. For example, when the voltage of the combination signal which has triangular shape increases past the predetermined voltage level, the conducting conditions of the transistors 186 and 188, which will be described later, will reverse and thereby produce a square wave output which has variable width positive and negative going portions. The average value of this variable width output signal is proportional to the ratio of the two input signals. In this way, the present device can be used to establish a ratio or quotient which may vary between zero and infiinity depending on the relative magnitudes of the inputs. The subject device is therefore able to cover the full range of possible quotient outputs.

The outputs thus produced have many possible uses including being used to control the operation of plotting devices, to determine the ratio of forces or stresses acting on members under test and other conditions, it can be used in computer applications and for many other applications particularly applications where quotient signals are needed. The subject device can also be used to test or compare the reactions of substances under various conditions such as the reactions and forces acting on members under vibration or other test conditions. For example, the device has particular application in the aircraft industry as a means to determine the forces and relation of forces acting on various components. It is also important to note that the subject means including the division means are entirely electronic and do not include or require any moving parts. The inputs to the present circuit means, however can be alternating signals as described or they can be D.C. inputs in which case the channel rectifying means may be omitted.

The output of the amplifier circuit 26 is fed to the quotient detector circuit 16 on terminal 152 and lead 158 (FIG. 4) and the output from the D.C. amplifier circuit 32 is fed to the detector 16 on lead 160. These signals are mixed or combined as they enter the detector 16 and are applied to the grid of vacuum tube 162. The tube 162 is connected in series with another tube 164 between the positive and negative supply voltages and the plate of the tube 164 is connected to the grid of another vacuum tube 166 in the succeeding stage. The tube 166 is also in series with still another tube 168 across the supply voltages. An output is taken from the common connection between the plate of the tube 168 and the cathode of the tube 166 and is applied to the grid of the next stage vacuum tube 170 which is in series with tube 172. The output from this stage is similarly taken from their commonly connected plate and cathode and is applied to the common side of two capacitors 176 and 178. The opposite sides of these capacitors are connected respectively to opposite ends of a balancing potentiometer 180 and to ground through respective diodes or rectifiers 182 and 184. The potentiometer 180 has an adjustable tap 185 which is connected to a collector and an emitter of transistors 186 and 188 as shown. The adjustable tap 185 is also connected through rectifier 190 to the base of the transistor 186 and by another connection to the grid of vacuum tube 192. The base of the transistor 188 is similarly connected through another diode or rectifier 194 to the other emitter and collector of the transistors 186 and 188 and to a feedback lead 196 which has its opposite end connected to the grid of the tube 162 to provide feedback for control purposes.

The triangular or saw tooth input signals from channel 12 may be the divisor signals in the division operation and the D.C. signals from the channel 14 the dividend input. These signals are combined as they enter the detector circuit 16 and the balancing potentiometer 180 is adjusted to produce the desired operating or conducting conditions of the transistors 186 and 188. The output on lead 197 as already stated is a constant frequency pulse width modulated signal representing the quotient of the division operation. The diodes 190 and 194 in the circuit of the transistors 186 and 188 are silicon diodes provided to permit current flow in only one direction through the transistors. The diodes 182 and 184 which are connected respectively between the ends of the balancing potentiometer 180 and the negative side of the supply are provided for clamping and stabilizing purposes.

The detector circuit therefore receives input signals which are a combination of the D.C. output of the channel 14 and the triangular output of the channel 12. These signals are processed in a clamping circuit which is part of the detector circuit and the output of the detector circuit is an unsymmetrical square wave whose average value is proportional to the ratio of the two input signals. The output is converted to a D.C. signal in the circuit 36 and is amplified. The amplitude of the D.C. output of the circuit 36 is proportional to the ratio of the two input signals.

In an actual plotting or vibration testing application employing the subject device two transducers are used in order to produce relative motion between a plotting surface and a plotting instrument or between the part being tested and a reference part. One transducer is connected to the plotting table and generates an A.C. signal whose amplitude is directly proportional to the vibrated amplitude of the shake table to establish a reference signal and the second transducer is mounted to produce a signal proportional to the vibration amplitude at the plotting instrument or stylus to which it is attached. These two signals are combined and fed to the quotient detector circuit as described above to produce a D.C. output proportional to the ratio thereof. With such a set up it is possible to measure and/or plot the transmissibility between the structures. The transmissibility can be plotted on an X–Y plotter with the transmissibility plotter driving the Y axis of the plotter and a D.C. voltage proportional to the frequency of the shake table driving the X axis of the plotter. Many other applications of the present device are also possible.

The output of the detector circuit 154 on the lead 197 is applied to the grid of the vacuum tube 192 of the amplifier-clamper circuit 34 (outline 198 in FIG. 4) which is simply a multi-stage amplifier circuit which amplifies and clamps the quotient signal to produce a constant peak-to-peak output signal level. The output of the amplifier-clamper circuit 34 on lead 200 is applied through the dual Zener diode 202 to a second output lead 204. The dual Zener diode 202 is a device which shapes the output signal by making the positive peaks of substantially the same magnitude as the negative going peaks. The output on the lead 200 is also applied to a meter 206 (FIG. 5) through resistor 207 and the meter provides a visual indication of the magnitude of the output.

The shaped output on the lead 204 is applied to an adjustable tap on potentiometer 208 which has its opposite ends connected to ungrounded sides of two oppositely polarized diodes or rectifiers 210 and 212 also in the circuit 36 (outline 213 of FIG. 5). The circuit of the rectifiers 210 and 212 in combination with the potentiometer 208 sets up a bias voltage to compensate for inaccuracies in the quality of the output signal produced by the dual Zener diode 202.

Another potentiometer 214 is connected in across the resistor 207 and the meter 206, and has its adjustable tap connected through resistor 216 to the grid of vacuum tube 218. The cathode of the tube 218 is connected to the cathode of another tube 220 through another potentiometer 222 which has an adjustable tap connected through resistor 224 to the negative supply voltage. The plates of the tubes 218 and 220 are connected respectively to the grids of other tubes 226 and 228 which have their cathodes connected together and to the negative supply through resistor 230. The plate of the tube 226 is connected to the positive voltage supply through resistor 232, and the plate of the tube 228 is similarly connected to the positive supply voltage through resistor 234 and also through another resistor 236 to the grid of still another tube 238 which is the output tube of the entire circuit. The output of the circuit is taken at the cathode of the tube 238 on lead 240. The other side of the output is on lead 242 which is grounded. Another tube 244 is connected between the grid of the tube 238 and the negative supply voltage as shown, and the grid of the tube 244 is connected to a bias circuit for the grid of the output tube 238, which bias circuit includes resistors 246 and 248 and capacitor 250.

Certain elements have been omitted from this description either because their functions are not particularly important to an understanding of the invention or because they operate similarly to components already described in detail.

The output on leads 240 and 242 is a D.C. voltage porportional to the quotient obtained by division of the two input signals. This output can be used for many purposes including controlling a plotting device such as a device which plots information on a coordinate system as described. In this application, the plotting device will continuously plot the instantaneous quotient obtained by dividing two input quantities. The output can also be a measure of transmissibility which is a term used to describe a relationship or ratio between two things such as the relationship or ratio of two vibrations. For example, it can be used to measure the forces acting on one or more components of an airplane in relation to the forces acting on the other components or on the whole plane. This can be done by producing signals responsive to the components to be compared while the airplane is being vibrated. There are also many other possible applications for the subject circuit including computer applications, control applications where division is required, force resolution and simulation problems and so on. In fact any application where it is required to find the ratio between two signals. The subject device can also be modified and simplified so as to find the ratio between D.C' signals, if desired.

The particular circuit embodiment chosen to illustrate the invention is relatively complex and is also susceptible of a wide variety of changes, modifications and variations depending upon the purpose or application for which it is to be used, and it is not intended to limit the invention to a particular application or embodiment.

Thus there has been shown and detscribed novel electronic detector means for detecting and dividing input signals to produce an output quotient signal representing the ratio of the inputs, which in the disclosed embodiment is the ratio of the signal to the reference inputs.

What is claimed is:

1. Means for dividing first and second input signals to produce an output signal representing the quotient of said inputs, said means comprising a first circuit channel connected to receive a first input signal and a second circuit channel connected to receive a second input signal, each of said channels including means for converting the respective input signals into D.C. signals the magnitudes of which are proportional to the magnitudes of the associated inputs, means in said first channel for modulating the associated D.C. signal, means in the same channel for integrating the modulated signal to produce a triangular signal which alternates between values of opposite polarity, a division circuit having an input connected to receive and combine the triangular signals produced by said first channel and the D.C. signals produced by the second channel, said division circuit including electronic means for producing an output signal that represents the quotient obtained by dividing the second input by the first input.

2. The means defined in claim 1 wherein said division circuit includes means for adjusting said division circuit to produce a symmetrical square wave output whenever the input signal to said second channel represents zero.

3. The means defined in claim 1 wherein said means for converting the respective input signals into D.C. signals in each of said channels includes amplifier means, rectifier means, and filter means.

4. The means defined in claim 1 wherein the modulator means includes means for converting a D.C. signal produced in the first channel into a square wave signal whose amplitude is proportional thereto.

5. A detector circuit comprising first and second signal channels each having an input connected to a respective source of input signals, said first channel including means for converting the associated input signal into a D.C. signal having amplitude characteristics which vary in proportion to the amplitude characteristics of the associated input signal, means in said first channel for modulating the D.C. signal to produce a constant frequency square wave signal whose amplitude depends on the magnitude of said D.C. signal, means for converting said square wave signal into a triangular shaped signal whose amplitude characteristics depend on the amplitude characteristics of the square wave signal, said second channel including means for converting the associated input signal received from its associated input source into a D.C. signal whose amplitude characteristics vary in proportion to the amplitude characteristics of said associated input signal, means for combining the triangular wave signal from the first channel with the D.C. signal from the second channel, and means for converting said combined signals into a D.C. signal whose amplitude varies in proportion to the ratio of the said input signals.

6. The detector circuit of claim 5 wherein said means for converting the combined signals includes means for producing a constant frequency unsymmetrical square wave signal which has positive and negative polarity portions the magnitude of the unsymmetry of which varies in proportion to the ratio of the magnitudes of the input signals.

7. The detector circuit defined in claim 6 wherein said means for producing an unsymmetrical square wave signal include means for adjusting the magnitude of the unsymmetry of the positive and negative polarity portions of the unsymmetrical square wave signal.

8. Means for dividing first and second signals to produce a quotient signal output proportional to the ratio of said first and second signals, said means comprising first and second signal sources each including means for producing a D.C. signal component, means for modulating the D.C. signal produced by one of said sources including means for producing a triangular shaped signal proportional to the magnitude thereof, division circuit means including means for combining the triangular shaped signal from said one source with the D.C. signal from the other source to produce a combination signal therefrom, and circuit means including first and second polarized members connected to respond to the magnitude of the combination signal, said first polarized member passing current whenever the magnitude of the combination signal exceeds a predetermined magnitude, and said second polarized member passing current in the opposite direction whenever the magnitude of said combination signal is less than said predetermined magnitude, and means responsive to the current flow produced by said first and second polarized members to produce a variable width pulse modulated signal the characteristics of which are proportional to the ratio of the two D.C. input signals.

9. The means for dividing defined in claim 8 including means for limiting the magnitude of the pulse width modulated signals to produce a pulse width modulated square wave signal, and means for converting said square wave signal to a D.C. output signal the magnitude of which is proportional to the ratio of the first and second signals.

10. Means for dividing first and second input signals to produce an output signal representing the quotient of said inputs, said means comprising a first circuit channel connected to receive a first input signal and a second circuit channel connected to receive a second input signal, each of said channels including means for converting the respective input signals into D.C. signals the magnitude of which is proportional to the magnitude of the associated input, means in one of said channels for modulating the associated D.C. signal, means in the same channel for integrating the modulated signal to produce a triangular signal, a division circuit having an input connected to receive the triangular signal produced by said one channel and the D.C. signal produced by the other channel, said division circuit including electronic means for producing an output signal that represents the quotient obtained by dividing the inputs from the first and second channels, said division circuit also including two transistors each having a base element, an emitter element, and a collector element, means for connecting an emitter element on each of said transistors to the collector element on the other transistor, rectifier means connected between the base of each of said transistors and the associated collector element, and means for producing a feedback signal from the collector of one of said transistors to the input of the division circuit.

References Cited

UNITED STATES PATENTS 2,397,540   4/1946   Dome _____ 324—140 X
2,966,307   12/1960  Schmid _____ 235—196

RUDOLPH V. ROLINEC, Primary Examiner

ALFRED E. SMITH, Assistant Examiner

U.S. Cl. X.R.

235—196; 328—161